United States Patent Office 3,426,028
Patented Feb. 4, 1969

3,426,028
PIPERIDINE DERIVATIVES AND THEIR SALTS
Gustav Ehrhart, Bad Soden, Taunus, and Leopold Ther and Hans-Georg Alpermann, Kelkheim, Taunus, and Heinrich Ott, Eppstein, Taunus, Germany, assignors to Farbwerke Hoechst Aktiengesellschaft vormals Meister Lucius & Bruning, Frankfurt am Main, Germany, a corporation of Germany
No Drawing. Filed Nov. 16, 1965, Ser. No. 508,132
Claims priority, application Germany, Dec. 3, 1964, F 44,603/64
U.S. Cl. 260—294.3                 4 Claims
Int. Cl. C07d 29/24, 29/10

ABSTRACT OF THE DISCLOSURE

Analgesically active piperidine derivatives, and salts thereof, of the formula

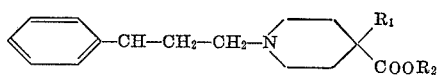

in which R is phenyl or cyclohexene-(1)-yl, $R_1$ is phenyl or cyclohexyl and $R_2$ is an alkyl of up to four carbon atoms.

---

The present invention relates too analgesically active piperidine derivatives corresponding to the general formula

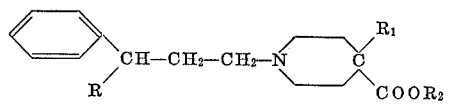

wherein R represents the phenyl- or the cyclohexene-(1)-yl-radical, $R_1$ the phenyl- or the cyclohexyl radical and $R_2$ is an alkyl group of low-molecular weight having at most 4 carbon atoms, and their salts as well as to a process for their manufacture. Said compounds are prepared (a) by condensing aldehydes of the general formula

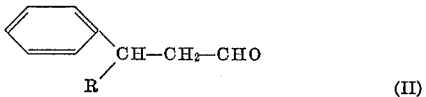

with compounds of the general formula

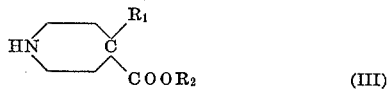

and simultaneously or subsequently hydrogenating them, or
(b) by reacting compounds of the general formula

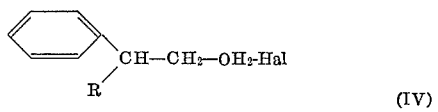

wherein Hal is a halogen atom, with compounds of the general Formula III, if desired in the presence of agents splitting off hydrogen halide or
(c) by reacting diphenyl-methane with compounds of the general formula

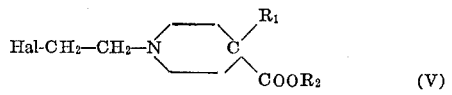

if desired in the presence of agents splitting off hydrogen halide, or (d) hy hydrolising in a compound of the general formula

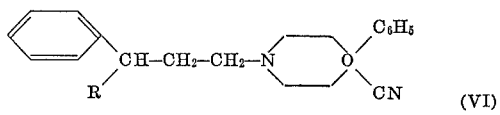

the nitrile-group by treatment with strong acids or strong bases in order to obtain the carboxyl group and esterifying the latter, without isolation, with lower aliphatic alcohols containing at most 4 carbon atoms, or
(e) by treating compounds of the general formula

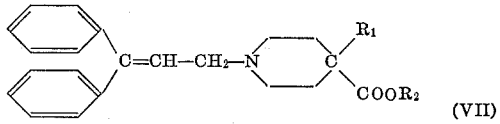

with hydrogen,
and by converting, if desired, the compounds obtained into their salts by treating them with inorganic or organic acids.

The aldehydes of the general Formula II used according to the method described (sub paragraph a) can be obtained by condensation of diphenyl-acetonitrile or phenyl-cyclohexylidene-acetonitrile with chloro-acetaldehydediethyl-acetal in the presence of sodium amide, splitting of the nitrile group and hydrolysis of the acetal radical. The piperidine derivatives of the general Formula III can be prepared according to the method described in "Berichte der deutschen chemischen Gesellschaft," volume 74 (1942), pages 1446 et seq. Of the low alkyl esters of 4-phenyl-4-carbalkoxy-piperidine or of 4-cyclohexyl-4-carbalkoxy-piperidine whose alkyl group $R_2$ may contain up to 4 carbon atoms, the corresponding ethyl ester is particularly suitable.

Generally, the condensation of the aldehydes of the Formula II with the piperidine derivatives of the Formula III occurs spontaneously when the two components are brought into contact with one another. The condensation may be completed, if desired, by heating the components in an inert solvent, and, favorably, eliminating at the same time the water split off. The hydrogenation of the Schiff's base formed which, if desired, can likewise be isolated is carried out, in general, simultaneously with or directly after the condensation without isolation of the condensation product. The reduction of the condensation products or of the aldehydes of Formula II respectively in the presence of piperidine derivatives of the general Formula III can be realized, for instance, by adding sodium boron-hydride to the condensation product dissolved in an organic solvent. As solvents may be used, for instance, lower alcohols such as methanol, ethanol or isopropanol.

The reduction may likewise be carried out by means of aluminum amalgam and alcohol or sodium amalgam, or it can favorably be effected by catalytic hydrogenation, but only if R in the general Formula II represents the phenyl group, since in the case of R being the cyclohexenyl radical, a simultaneous hydrogenation of the double linkage would occur. The catalytic hydrogenation is carried out with the aid of metals of the 8th group of the Periodic System, preferably nickel catalysts, in the presence of the usual solvents, such as alcohols, aqueous alcohols, or water. Precious metals such as platinum, palladium or Raney catalysts may likewise be used.

According to a further advantageous embodiment of the process of the present invention (sub paragraph b) the piperidine derivatives of the general Formula III can likewise be reacted with compounds of the general Formula IV. As compounds corresponding to the general Formula IV there may be used, for instance, 1,1-diphenyl-3-chloro-propane, 1,1-diphenyl-3-bromo-propane, 1,1-diphenyl-3- iodo-propane as well as the corresponding 1-cyclohexenyl-1-phenyl-3-chloro-propanes, 1-cyclohexenyl - 1 - phenyl-3-bromo-propanes, 1-cyclohexenyl-1-phenyl - 3 - iodo-propanes. If desired, this reaction can be materialized in an appropriate solvent such as ether, chloroform or aromatic hydrocarbons, by prolonged heating, it being advisable to use 2 mols of the piperidine derivative used for binding the hydrogen-halide set free. The linking of hydrogen halide can likewise be effected by the usual agents such as alkali metal carbonates and alkaline earth metal carbonates, alkali metal hydroxides and alkline earth metal hydroxides, as well as organic bases such as pyridine or quinoline, which, if desired, may likewise serve as solvents. The substance is worked up in the usual manner by separating off the hydrohalic acid salt of the base used, for instance, by precipitation with ether or shaking out with water.

Another possibility of preparing the products of the present invention is described (sub paragraph c). It consists in reacting diphenyl-methane with halogen compounds of the general Formula V. The latter can be produced, for instance, by reacting a 4-phenyl-4-carbalkoxy-piperidine or a 4-cyclohexyl-4-carbalkoxy-piperidine with ethylene-oxide and converting the N-($\beta$-hydroxy-ethyl)-compound by means of a halogenating agent such, for instance, as thionyl-chloride, into the N-($\beta$-halogen-ethyl)-4-phenyl (or cyclohexyl)-4-carbalkoxy piperidine derivatives. The diphenyl-methane is reacted with the compounds of the general Formula V in the presence of agents splitting off hydrogen halide. As such, there are mentioned, for instance, sodium amide, phenyl-sodium, phenyl-lithium and metallic sodium. In said case, the use of phenyl-sodium is of particular advantage. The reaction may be carried out as described in Liebigs Annalen der Chemie, volume 561, p. 52 et seq. (1948). Inert organic solvents, such as benzene, toluene or xylene are preferably used for the reaction. It is of advantage to dissolve or suspend two of the three reaction components required (diphenyl-methane, agent splitting off hydrogen halide and halogen agent) in an inert solvent and the third component is portionwise added. After terminated addition, the solution is suitably boiled for some time under reflux and upon addition of water the reaction mixture is worked up in the usual manner, for instance, by extraction of the basic components from the organic solvent by means of dilute acids. According to the above described process, the products corresponding to the general Formula I are obtained, in which R represents a phenyl radical, since diphenyl-methane is used as starting substance.

The products obtained according to the present invention can likewise be produced according to the method disclosed (sub paragraph d) by which the nitrile group of a compound of the general Formula VI i.e. of 1-[1',1'-diphenyl - propyl - (3')] - 4 - cyano - 4 - phenyl - piperidine or 1 - [1'-cyclohexenyl-1'-phenyl-propyl-(3')]-4-cyano-4-phenyl-piperidine is converted by hydrolysis into the carboxyl group and then esterified. The compounds of the Formula VI can be prepared in different ways. For instance, 1,1-diphenyl-3-amino-propane can be reacted with 2 mols of 1-chloro-ethanol-(2), the 3-[N-bis-hydroxy-ethyl)-amino]-1,1-diphenyl - propane obtained can be converted by means of halogenating agents, such as thionyl-chloride, into the corresponding bis-halogen-ethyl compound and the latter is subsequently condensed with benzyl-cyanide. This method of preparation corresponds to that described in Ber. dtsch. chem. Ges. 74, p. 1443 et seq. (1941) for the preparation of 1-methyl-4-phenyl-piperidine-4-carboxylic acid nitrile. For preparing the nitriles of the general Formula VI variations of the above-described synthesis can likewise be applied, for instance, those described in "Ullmanns Encyclopädie der technischen Chemie," 3rd edition, 13th volume, p. 286 et seq. for the preparation of 1-methyl-4-phenyl-piperidine-4-carboxylic acid nitrile. The starting substances of the general Formula VI in which R represents a phenyl group can likewise be prepared by reacting benzene with 1-[1'-phenyl - 1' - hydroxy - propyl - (3)] - 4 - cyano-4-phenyl-piperidine according to the method of Friedel-Craft.

The nitrile group in the compounds of the general Formula VI is generally hydrolyzed by boiling them for several hours with strong inorganic acids, for instance, sulfuric acid, which is used in a high concentration of, for instance, 60–80%, preferably 75%. The nitrile to be hydrolyzed and the sulfuric acid are heated to elevated temperatures of about 120–150° C. until a sample demonstrates by solubility in an alkaline medium that the corresponding carboxylic acid has been formed. For esterification, the corresponding alcohol is dropwise introduced into the reaction mixture at an elevated temperature, generally above 100° C., whereby esterification is caused and alcohol is removed by distillation simultaneously with the water split off. When no more water can be detected in the alcohol distilling off, heating to elevated temperatures of about 120–130° C. is continued, the addition of alcohol being interrupted. The substance is worked up in the usual manner, for instance, by rendering the reaction mixture alkaline, the base is liberated and shaken out with an organic solvent such as ether.

The hydrolysis of the nitrile to carboxylic acid can likewise be carried out with strongly alkaline solutions; for instance sodium hydroxide solution or potassium hydroxide solution of 40–50% strength are used, preferably in alcoholic solution. Likewise in this case the substance must be heated for several hours to high temperatures, the operation being preferably carried out in a pressure vessel at 150–180° C. After isolation of the acid thus obtained, the esterification proceeds in the manner described.

Finally, the products can be obtained according to the method described in subparagraph (e) by treating compounds corresponding to the general Formula VII with hydrogen. The unsaturated compounds of the general Formula VII used as starting substances can be prepared, for instance, by dehydrating 1-[1',1'-diphenyl-1'-hydroxy-propyl-(3')]-4-phenyl-(or cyclohexyl) - 4 - carbalkoxy-piperidine. These hydroxy compounds can be obtained, for instance, by reacting 4-carbalkoxy-4-phenyl-(or cyclohexyl)-piperidino-propionic acid esters with organometallic compounds such as phenyl-magnesium halides or phenyl-lithium. In principle, the reaction corresponds to the method of preparation disclosed in German Patent 1,144,735 for 1,1-diphenyl-1-hydroxypropane derivatives. Water can be split off from said hydroxy-compounds with the aid of the usual dehydrating agents, for instance, phosphoric acid, p-toluene-sulfonic acid, phosphorus pentoxide or acetic acid anhydride.

The hydrogenation of the double linkage in compounds of the general Formula VII can be carried out by catalytic hydrogenation in the presence of metals of the 8th group of the Periodic System. In particular, there are suitable for this purpose platinum and palladium catalysts or Raney nickel or cobalt. The hydrogenation is performed in the usual solvents such as lower alcohols, aqueous alcohols and the like. It is generally carried out in the pressure vessel at an elevated temperature, preferably between 50 and 200° C. For working up the product, the catalyst is filtered off and the solvent is evaporated.

As basic compounds, the products of the present invention can be converted into the corresponding salts with the aid of inorganic or organic acids. As inorganic acids there are mentioned: hydrohalic acids such as hydrochloric acid, hydrobromic acid, sulfuric acid, phosphoric acid and amidosulfonic acid. As organic acids, the following acids are used for instance: acetic acid, propionic acid, lactic acid, glycolic acid, gluconic acid, maleic acid, succinic acid, tartaric acid, benzoic acid, salicylic acid, citric acid, acetamino acetic acid, hydroxyethane-sulfonic acid and ethylene-diamino-tetracetic acid.

The products obtained according to the invention show very good therapeutic properties. They can be administered parenterally or orally as such or in the form of the corresponding salts, if desired, likewise in admixture with the usual pharmaceutical carrier substances. If orally applied, they are preferred in the form of tablets or dragees containing in addition to the compounds of the invention the usual adjuvants and carrier substances such as lactose, starch, tragacanth and magnesium stearate.

The products of the invention are valuable medicaments distinguished by a very good analgesic activity and—in comparison with other analgesics—a relatively low toxicity.

They were compared, for instance, with the known 1-methyl-4-carbethoxy-4-phenyl-piperidine showing analgesic activity. The results obtained by this test are compiled in the following table. The designation of the products by I, II and III in the table corresponds to the compounds obtained according to Examples 1, 2 and 3.

of benzene and 80 grams of chloracetaldehyde-diethylacetal are added. After addition of 22.5 grams of sodiumamide in small portions, the mixture becomes warm. It is then boiled for 2 hours under reflux. After addition of water, the organic layer is separated, dried by means of potassium carbonate and the solvent is distilled off. 150 grams of $\beta,\beta$-diphenyl-$\beta$-cyano-propionaldehyde diethylacetal remain behind in the form of a light-brown oil.

In order to split off CN, this oil is dissolved in 300 cc. of benzene, 75 grams of sodium amide are added and the whole is boiled for 3 hours under reflux. After working up in the manner described above, 94 grams of $\beta,\beta$-diphenyl-propionaldehyde-diethylacetal of a boiling point of 124–125° C. under a pressure of 0.2 mm. of mercury are obtained. For the hydrolysis of the diethylacetal obtained, into the diphenyl-propionaldehyde,

TABLE

| Substance | Toxicity, minimum lethal dose in mice with oral application (mg./kg.) | Analgesic dose orally applied (mg./kg.) | Action (light beam method in mice), prolongation of the reaction period to pain in seconds. Time after application (min.) | | | | | Maximum of action | Duration of the analgesic effect |
|---|---|---|---|---|---|---|---|---|---|
| | | | Normal | 30 | 60 | 240 | 360 | | |
| 1-methyl-4-carbethoxy-4-phenyl-piperidine. | 200 | 50 | 5.7 | 9.8 | 9.1 | 6.3 | | After 15 to 30 minutes | Less than 2 hours. |
| I | 2,000 | 50 | 6.1 | 10.9 | 13.5 | 13.6 | 13.2 | Upon 1 hour | More than 6 hours. |
| II | 500 | 40 | 5.3 | 18.9 | 16.0 | 13.5 | 12.7 | After 30 minutes to 1 hour | Do. |
| III | 800 | 100 | 5.7 | 8.7 | 10.2 | 10.0 | 10.0 | After 1 hour | Do. |

The values indicated in the table for the acute toxicity were determined pro dosi in 10 mice, each dose of the corresponding preparation having been given 4 to 5 times. It is advisable to use the minimum lethal dose when indicating the toxicity, since an $LD_{50}$ cannot be ascertained precisely.

The values of analgesic action were found by tests in 20–40 mice.

The products of the process of the invention are to be classified as substances showing an action similar to that of morphine. Upon oral application in mice they are distinguished by an analgesic effect stronger than that caused by 1-methyl-4-carbethoxy-4-phenyl-piperidine. The most favorable relation between effective dose and toxic dose is shown by compound I, which with the quotient of 1/40 shows a stronger activity than 1-methyl-4-carbethoxy-4-phenyl-piperidine with 1/4. The same applies to compound II with a quotient of 1/12 and to compound III with a quotient of 1/8. In animal tests, an increased dose causes complete loss of sensitiveness to thermal irritation.

As conspicuous property of the products of the present invention in comparison with 1-methyl-4-carbethoxy-4-phenyl-piperidine there is to be mentioned the long duration of activity in the animal test.

The following examples serve to illustrate the invention but they are not intended to limit it thereto:

Example 1.—1-[1′,1′-diphenylpropyl-(3′)]-4-phenyl-4-carbethoxy-piperidine (I)

9.3 grams of 4-phenyl-4-carbethoxy-piperidine are added to 8.4 grams of $\beta,\beta$-diphenyl-propionaldehyde, whereby the mixture is warmed and becomes turbid. After dissolution in methanol palladium-black is added and the whole is shaken in the shaking apparatus. After absorption of the calculated amount of hydrogen, the solution is filtered, the methanol is removed by distillation under reduced pressure and the residue is taken up with ether. Ethereal maleic acid is added to the ether solution. 16.7 grams of the crystalline maleate of 1-[1′,1′-diphenylpropyl-(3′)]-4-phenyl-4-carbethoxy-piperidine are obtained. After recrystallization from alcohol the substance melts at 167–169° C.

The glycolate of the base melts at 123–124° C.

Preparation of $\beta,\beta$-diphenyl-propionaldehyde.—56.5 grams of diphenyl-acetonitrile are dissolved in 200 cc.

94 grams of the acetal are heated with 500 cc. of 2 N-sulfuric acid on the steam bath for 1 hour with stirring. After cooling, the substance is extracted with ether and distilled under reduced pressure. 67 grams of $\beta,\beta$-diphenyl-propionaldehyde of a boiling point of 129–130° C. under a pressure of 0.01 mm. of mercury are obtained.

Example 2.—1-[1′-phenyl-1′-cylohexenyl-propyl-(3′)]-4-phenyl-4-carbethoxy-piperidine (II)

9.3 grams of 4-phenyl-4-carbethoxy-piperidine are added to 8.6 grams of phenyl-cyclohexenyl-propionaldehyde. The mixture becomes warm and turbid and is dissolved in about 50 cc. of methanol. After addition of 1 gram of sodium-boron-hydride it is allowed to stand for about 10 minutes and then acidified by means of dilute hydrochloric acid. After removal of the methanol by distillation under reduced pressure and addition of ether, the hydrochloride separates as third layer which crystallizes in the course of several hours. After recrystallization from alcohol and ether the 1-[1′-phenyl-1′-cyclohexenyl-propyl-(3′)]-4-phenyl - 4-carbethoxy-piperidine-hydrochloride is obtained which melts at 118–120° C.

Preparation of $\beta$-phenyl-$\beta$-cyclohexenyl-propionaldehyde.—148 grams of phenyl-cyclohexylidene-acetonitrile (boiling point 169–171° C. under a pressure of 8 mm. of mercury), prepared by condensation of cyclohexanone and benzylcyanide in the presence of sodium alcoholate, and 133 grams of chloro-acetaldehyde-diethyl-acetal are dissolved in 300 cc. of benzene and 34 grams of sodiumamide are portionwise added. After boiling for 1 hour under reflux, water is added, the organic layer is separated off, washed with water and dried. After distillation of the benzene, 223 grams of $\beta$-phenyl-$\beta$-cyclohexenyl-$\beta$-cyano-propionaldehyde-diethylacetal are obtained in the form of an oil.

The cyane is split off in the same manner as described in Example 1 for the $\beta,\beta$-diphenyl-$\beta$-cyano-propionaldehyde-diethylacetal. After hydrolysis of the diethylacetal group in the manner described in Example 1, the $\beta$-phenyl-$\beta$-cyclohexenyl-propionaldehyde of a boiling point of 92–94° C. under a pressure of 0.01 mm. of mercury is obtained.

Example 3.—1-[1′,1′-diphenyl-propyl-(3′)]-4-cyclohexyl-4-carbethoxy-piperidine (III)

Preparation of 4-cyclohexyl-4-carbethoxy-piperidine: 25 grams of 4-phenyl-4-carbethoxy-piperidine are dissolved in 200 cc. of glacial acetic acid, platinum-oxide is added and the whole is shaken with hydrogen at 50–60° C. After absorption of the calculated amount of hydrogen it is filtered off, the glacial acetic acid is distilled off under reduced pressure and the residue is dissolved in water.

After addition of potassium carbonate solution a white carbonate separates which is filtered off with suction and dissolved in dilute hydrochloric acid. After rendering the substance alkaline by means of dilute sodium hydroxide solution, it is extracted with ether, the ether is distilled off and the residue is distilled under reduced pressure. 22.1 grams of 4-cyclohexyl-4-carbethtoxy-piperidine of a boiling point of 100–101° C. under a pressure of 0.1 mm. of mercury are obtained.

4.78 grams of the piperidine-derivative thus obtained are added to 4.2 grams of β,β-diphenyl-propionaldehyde and then dissolved in methanol. The solution is shaken in the presence of palladium black with hydrogen at room temperature. After absorption of the calculated amount of hydrogen, it is filtered, the methanol is distilled off under reduced pressure and the residue is taken up with ether. After washing and drying of the ether solution the ether is distilled off, the residue is taken up in a small amount of methanol and the calculated amount of normal hydrochloric acid is added. The substance is then evaporated to dryness, and the residue obtained is dissolved in a small amount of alcohol and ether is added until turbidity sets in. 4.5 grams of 1-[1′,1′-diphenyl-propyl-(3′)] 4-cyclohexyl - 4-carbethoxy-piperdine-hydrochloride are obtained which melt at 172–173° C.

We claim:
1. A member selected from the group consisting of compounds of the formula

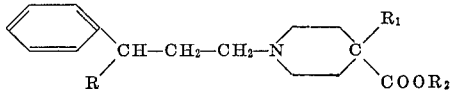

in which R is a member of the group consisting of phenyl and cyclohexene-(1)-yl, $R_1$ represents a member of the group consisting of phenyl and cyclohexyl and $R_2$ represents alkyl with up to 4 carbon atoms and the pharmaceutically acceptable acid addition salts thereof.

2. 1-[1′,1′-diphenylpropyl - (3′)] - 4 - phenyl-4-carbethoxy-piperidine.

3. 1-[1′-phenyl-1′-cyclohexenyl - propyl - (3′)] - 4-phenyl-4-carbethoxy-piperidine.

4. 1-[1′-diphenyl-propyl - (3′)] - 4 - cyclohexyl-4-carbethoxy-piperidine.

References Cited

UNITED STATES PATENTS

| | | | |
|---|---|---|---|
| 2,741,619 | 4/1956 | Lucas | 260—294.3 |
| 2,858,316 | 10/1958 | Morren | 260—294.3 |
| 2,880,211 | 3/1959 | Elpern | 260—294.3 |

HENRY R. JILES, *Primary Examiner.*

E. D. LEWIS, *Assistant Examiner.*

U.S. Cl. X.R.

260—293, 293.2, 999